United States Patent [19]
Geisel

[11] Patent Number: 5,558,463
[45] Date of Patent: Sep. 24, 1996

[54] SOIL REMEDIATION APPARATUS AND METHOD

[76] Inventor: Donald J. Geisel, 6 Jordan Ct., Clifton Park, N.Y. 12065

[21] Appl. No.: 407,763

[22] Filed: Mar. 21, 1995

[51] Int. Cl.⁶ ............................. B09C 1/06; E21B 36/00
[52] U.S. Cl. ........................ 405/128; 166/57; 405/131
[58] Field of Search .................. 405/52, 128, 130, 405/131; 166/57, 302, 303

[56] References Cited

U.S. PATENT DOCUMENTS

| | | | |
|---|---|---|---|
| 1,247,166 | 11/1917 | Steelquist . | |
| 3,994,341 | 11/1976 | Anderson et al. | 166/57 X |
| 4,611,950 | 9/1986 | Russomano | 405/128 |
| 4,842,448 | 6/1989 | Koerner et al. | 405/131 X |
| 4,982,788 | 1/1991 | Donnelly | 405/131 |
| 5,011,329 | 4/1991 | Nelson et al. | 405/128 |
| 5,018,576 | 5/1991 | Udell et al. | 405/131 X |
| 5,120,160 | 6/1992 | Schwengel | 405/128 |
| 5,181,655 | 1/1993 | Bruckelmyer | 405/131 X |
| 5,209,604 | 5/1993 | Chou | 405/128 |
| 5,233,164 | 8/1993 | Dicks et al. | 219/528 |
| 5,244,310 | 9/1993 | Johnson | 405/128 |
| 5,249,888 | 10/1993 | Braithwaite et al. | 405/128 |
| 5,277,518 | 1/1994 | Billings et al. | 405/128 |
| 5,286,140 | 2/1994 | Mather | 405/128 |
| 5,318,116 | 6/1994 | Vinegar et al. | 166/60 |
| 5,330,291 | 7/1994 | Heath et al. | 405/131 X |
| 5,435,666 | 7/1995 | Hassett et al. | 405/128 |
| 5,449,113 | 9/1995 | Bruckelmyer | 405/131 X |
| 5,449,251 | 9/1995 | Daily et al. | 405/128 |
| 5,482,402 | 1/1996 | Nelson | 405/128 |

FOREIGN PATENT DOCUMENTS

| | | | |
|---|---|---|---|
| 5-33326 | 2/1993 | Japan . | |
| 324340 | 2/1972 | U.S.S.R. . | |
| 1229-256 | 5/1986 | U.S.S.R. | 405/131 |

*Primary Examiner*—George A. Suchfield
*Attorney, Agent, or Firm*—Heslin & Rotheneberg, P.C.

[57] ABSTRACT

An integrated soil warming probe assists soil remediation by heating contaminated soil. A thermal probe is driven into the contaminated soil and fluid injected into the soil proximate the thermal probe for enhancing remediation. Such a soil warming probe includes an elongate tube with permeable walls and a conical cap at one end for assisting soil penetration. Circulating tubes within the hollow region of the elongate tube circulate contained fluid therein while providing thermal coupling between the contained fluid to the permeable walls of the elongate tube. The circulating tubes are disposed within the elongate tube so as to leave an independent channel between the circulating tubes and the permeable walls of the elongate tube for channeling a supplemental fluid within and out the permeable walls of the soil warming probe.

38 Claims, 6 Drawing Sheets fig. 1 fig. 2 fig. 3 fig. 4 fig. 5 fig. 6 fig. 7

5,558,463

SOIL REMEDIATION APPARATUS AND METHOD

BACKGROUND

1. Field of Invention

The present invention relates to soil remediation and more particularly to an integrated soil probe and method for facilitating soil remediation.

2. Background Information

Soil treatment for removing contaminants from surface soil has been of growing interest in recent years. Many methods are known for removing soil contaminants including excavating contaminated soil followed by incineration, in situ biological treatment of the soil, chemical treatment of the soil, etc. As used in the context of the present invention, soil is to be inclusive of landfills and other contaminated media.

Heating of the soil is known to facilitate soil remediation by: increasing the rate of chemical reactions for chemical treatment methods, increasing biological activities within biological treatment methods, vaporizing contaminates in vaporization processes, increasing the oxidation efficiency of oxidation treatments, and or simply facilitating thermal decomposition techniques. Examples of such heating methods include providing solar greenhouse covers over excavated contaminated soil, direct fired heating of excavated soil, and in situ warming of the soil by electricity.

Greenhouse covers warm the soil with limited temperature affects. The limited temperature limits the speed of soil remediation. Direct fired techniques require costly soil removal and transfer of the contaminated soil to and through a reactor furnace.

The techniques for heating soil electrically present another set of problems. Energy conversion efficiency is poor in producing electricity of 60 Hz or RF frequencies. High costs are associated with systems for handling the high voltage electricity and distributing it to desired electrodes in the ground. In addition, the required high voltages, i.e. 10 kV, present hazards when presented to ground level electrodes. Finally, the electrical techniques warm the ground non-uniformly, leaving hot spots within the ground that result from dielectric/resistivity variations with the geological structure of the ground.

Another technique for warming soil employs a thermal probe. The thermal probe is inserted into soil and heated for radiating heat to the soil. In heating the probe, hot water (or another heated liquid) is circulated through the probe. The thermal probe provides a safe and energy effective warming method, but has limited thermal conductivity to the surrounding soil. Because of the probe's limited thermal conductivity to the surrounding soil, steep temperature gradients exist within the soil surrounding the thermal probe resulting in non-uniformity of soil temperature.

DISCLOSURE OF THE INVENTION

It is thus an object of the invention to provide an improved apparatus and method for warming soil for facilitating soil remediation.

It is a further object of the present invention to provide an apparatus and method for warming soil uniformly and cost effectively.

It is another object of the present invention to provide an integrated soil probe for both warming soil and injecting fluids into the soil for enhancing soil remediation.

In accordance with the present invention, an apparatus is provided for assisting soil remediation. A thermal transfer device transfers thermal energy to contaminated soil. A dispersion device introduces a fluid into soil surrounding the thermal transfer device.

In accordance with another aspect of the present invention, a thermal probe is probed into contaminated soil to be remediated. Fluid is then injected into the soil along the length of the thermal probe for enhancing soil remediation.

In accordance with a further aspect of the present invention, an apparatus is provided for warming soil. A heater heats a contained fluid while a pump circulates the contained fluid within a coaxial probe. The coaxial probe includes an interfluid channel in communication with a cylindrical coaxial fluid channel that is defined coaxially about the inner channel. The coaxial probe is coupled to pass the contained fluid through the inner fluid channel and the cylindrical fluid channel as the contained fluid is circulated by the pump. A permeable tube is disposed adjacent the coaxial probe for dispensing supplemental fluid proximate the coaxial probe.

In accordance with yet another aspect of the present invention, an apparatus is provided for warming soil. An elongate tube has a hollow inner cavity, first and second ends and permeable walls. A conical cap at one end assists soil penetration. Thermal transfer means circulates contained fluid within the hollow inner cavity of the soil probe while thermally coupling the contained fluid to the permeable walls thereof. The thermal transfer means is disposed within the hollow inner cavity so as to leave an independent channel within the cavity between the thermal transfer means and the permeable walls for channeling a supplemental fluid within and through the permeable walls of the soil probe.

These, and other objects, features and advantages of this invention will become apparent from the following detailed description of the various aspects of the invention taken in conjunction with the accompanying drawings.

BEST MODE FOR CARRYING OUT THE INVENTION

Figure 1:
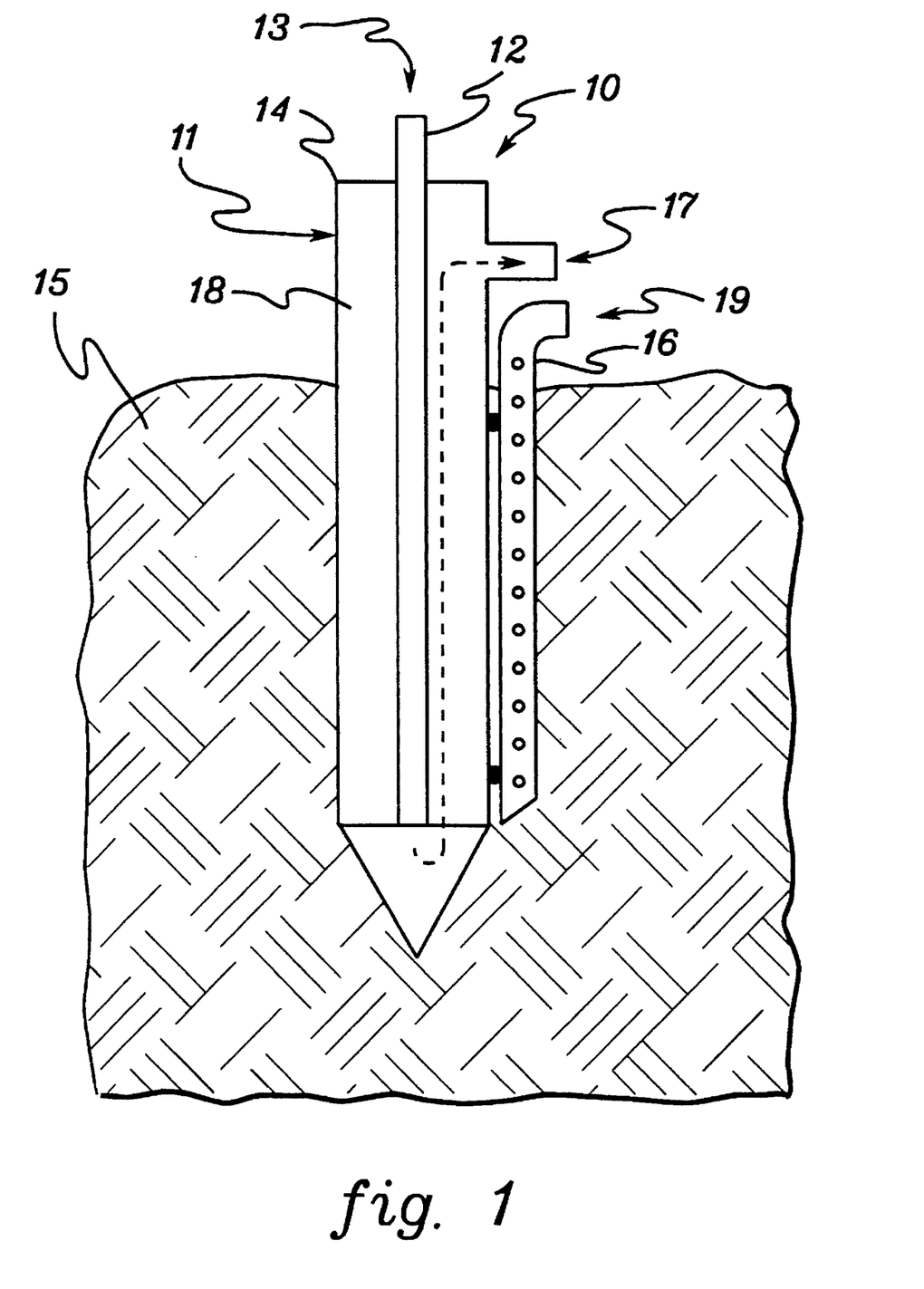
FIG. 1 is a cross-sectional view illustrating a soil warming probe in accordance with one aspect of the present invention.

With reference to FIG. 1, a soil warming probe 10 is shown in a cross-sectional view inserted to soil 15. Soil warming probe 10 includes coaxial probe 11 and permeable tube 16 adjacent or attached thereto. Coaxial probe 11 includes an outer tube member 14 having a hollowed inner region and a conical tip. Within the hollowed inner region of tube 14 is an inner small diameter tube 12. Small diameter tube 12 provides a hollow inner channel in communication with a coaxial channel 18 defined between the outside radius of the small diameter tube 12 and the inner radius of the outer tube 14. To provide thermal warming, hot water is introduced into water inlet 13 at the top of the small diameter tube 12 which flows along the inner channel of the small diameter tube 12 and into coaxial channel 18 between small tube 12 and outer tube member 14. The water flows up the coaxial channel, along the length of thermal warming probe 11, and out water outlet 17.

Permeable tube 16 is disposed adjacent the thermal probe 11 and has an entrance 19 for receiving supplemental fluid. Preferably, permeable tube 16 is attached to the thermal probe 11 as an integral member. The supplemental fluid is warmed and pulse dispensed into the soil along the length of permeable tube 16 proximate warming probe 11. The supplemental fluid, i.e. gases and liquid, introduced into the soil proximate warming probe 11 enhances the dissipation of heat away from warming probe 11 and into the surrounding soil. In addition, the supplemental fluid may provide nutrients for enhancing bioremediation.

Figure 2:
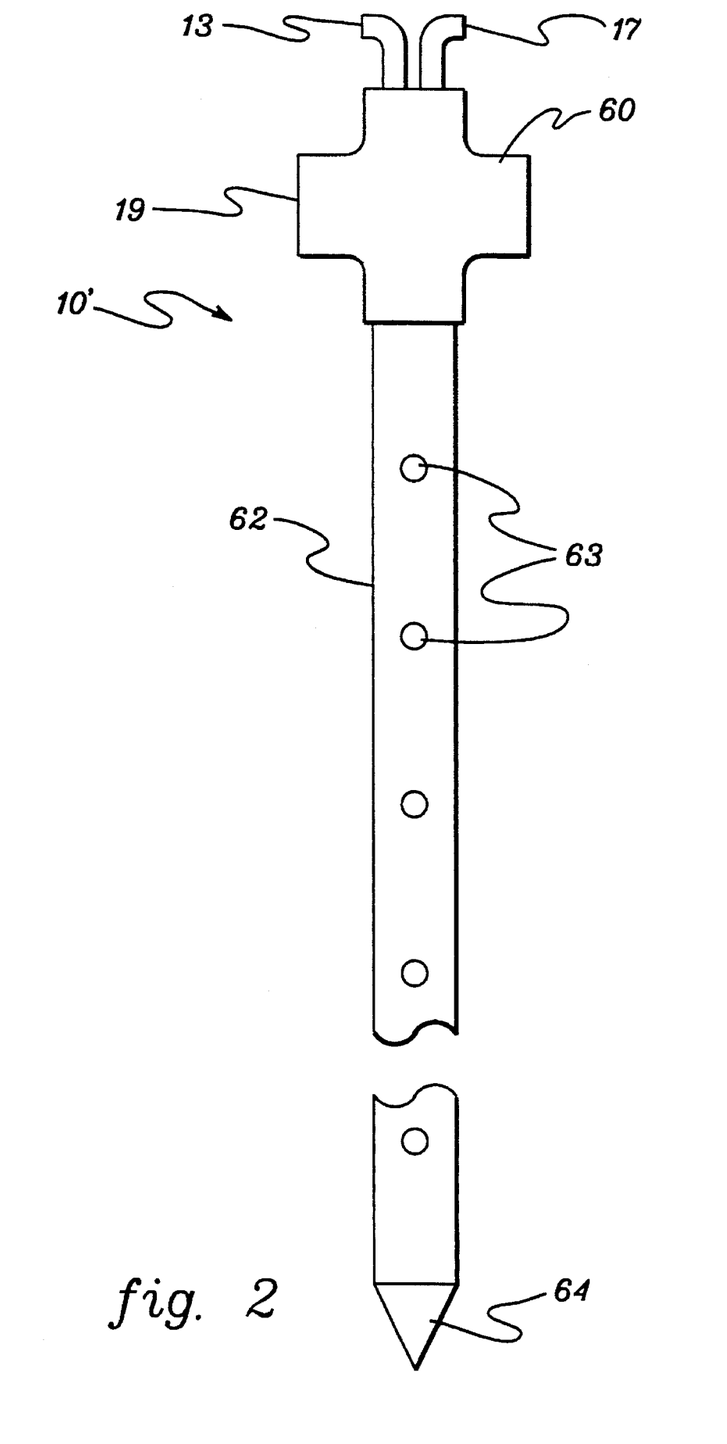
FIG. 2 is a side view illustrating a second embodiment of a soil warming probe in accordance with the present invention.

In an alternative preferred embodiment of the present invention, with reference to FIG. 2, an integrated thermal warming probe 10' integrates the functionality of thermal probe 11 and permeable tube 16 of the previous embodiment into a single probe. Integrated warming probe 10' comprises a permeable tube 62 with first and second ends. Conical tip 64 is disposed at the first end of permeable tube 62 for facilitating probe penetration into soil. Holes 63 are disposed in the side walls of permeable tube 62.

An end adapter 60 is coupled to the second end of permeable tube 62 for fixing into place heat transfer tubes 66,68 (see FIG. 3) disposed within the inside hollow chamber of permeable tube 62. In addition, adapter 60 has fluid entrance 19 for receiving and coupling supplemental fluid to inside channels between the outside walls of the heat transfer tubes 66,68 and the inside walls of permeable tube 62.

Figure 3:
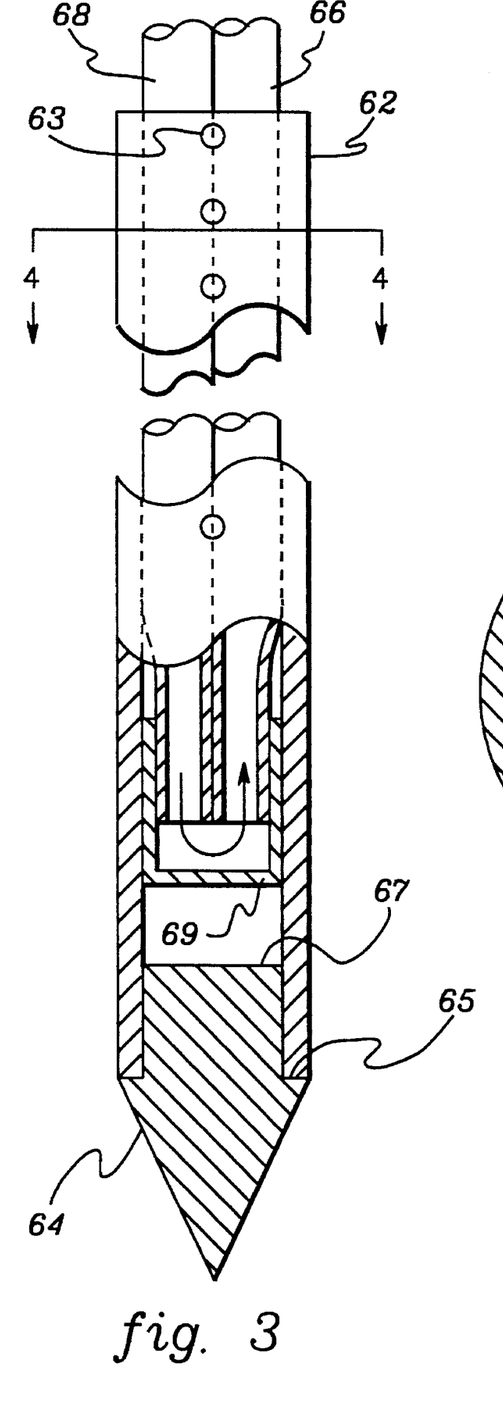
FIG. 3 is a partial cross-sectional view illustrating the soil warming probe of FIG. 2.
Figure 7:
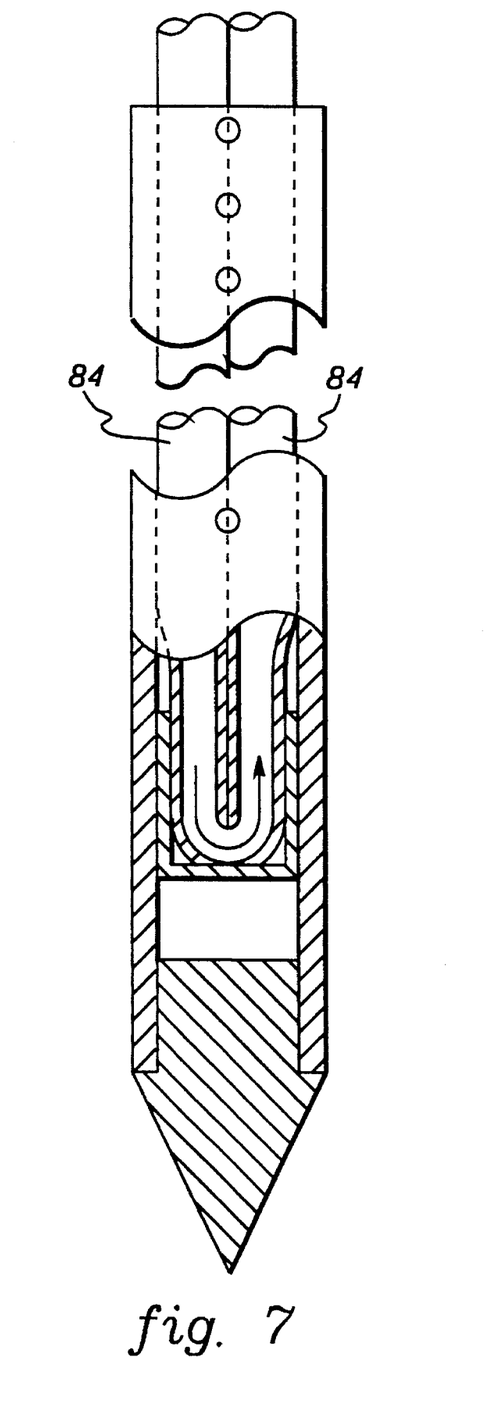
FIG. 7 is a partial cross-sectional view illustrating an alternate soil warming probe according to the present invention.

With reference to FIG. 3., heat transfer return tube 66 and heat transfer supply tube 68 are disposed inside the length of the permeable tube 62. Proximate conical tip 64, the tubes 66,68 have adjacent ends coupled to inner coupling member 69. Inner coupling member 69 seals tubes 66,68 to a self contained plenum that couples the inside fluid channel of supply tube 68 to the inside fluid channel of return tube 66. Alternatively, supply tube 68 and return, tube. 66.comprise a long tube 84 folded upon itself (see FIG. 7).

Figure 4:
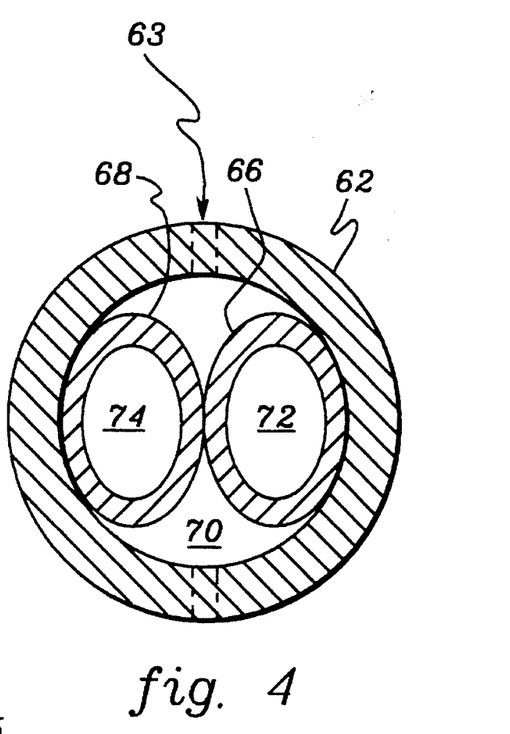
FIG. 4 is a sectional view taken across section 4 of FIG. 3.

Hot water inlet 13, with reference to FIG. 2, is provided at the upper end of heat transfer supply tube 68. Water outlet 17 is provided at the upper end of heat transfer return tube 66. Hot water inlet 13 is coupled for receiving hot water from a hot water supply source, while water outlet 17 is coupled for returning the cooler water back to the heater. Note that the outer walls of the heat transfer supply tube 68 and heat transfer return tube 66 are in intimate contact with the inside walls of permeable tube 62 as shown in FIG. 4. The intimate contact between these walls provides good thermal conductivity therebetween for coupling thermal energy from the circulating fluid within the transfer tubes 66,68 to permeable tube 62 and to the surrounding soil 15.

FIG. 4 shows that supply tube 68 and return tube 66 provide water circulating channels 74 and 72 respectfully within the tubes. Supplemental fluid channel 70 is provided between the outside walls of supply and return tubes 68,66 and the inside walls of permeable tube 62. This supplemental fluid channel is coupled to the fluid entrance 19 of end adapter 60. Either a liquid or gaseous pump is coupled to fluid entrance 19 for supplying supplemental fluid to internal channel 70 and out holes 63 of permeable tube 62. The supplemental fluid is warmed and pulse dispensed or otherwise passed through channel 70 to facilitate transfer of heat from thermal probe 10' to and into the surrounding soil 15. In addition, the supplemental fluid may provide the necessary gas or nutrients for enhancing bioremediation.

Conical tip 64 has a cylindrical insert portion 67 which is inserted into one end of permeable tube 62. The cylindrical insert slides into permeable tube 62 until shoulder 65 of conical tip 64 meets the distal end of permeable tube 62. If an interference fit is provided, then conical tip 64 becomes an integral part of permeable tube 62. Alternatively, a pin may be used to join the two members. It will be understood by one skilled in the art that conical tip 64 may take on many shapes so long as it facilitates penetration of soil.

In the preferred embodiment, permeable tube 62 comprises schedule 40 galvanized steel pipe. Conical tip 64 likewise comprises galvanized steel while supply and return tubes 68,66 are made of brass having 0.010 inch thick walls. However, it will be understood by one skilled in the art that permeable tube 62, supply and return tubes 68,66, and conical tip 64 can comprise other suitable conductive materials. In addition, each of these elements may be plated with an appropriate corrosive resistant material.

Figure 5:
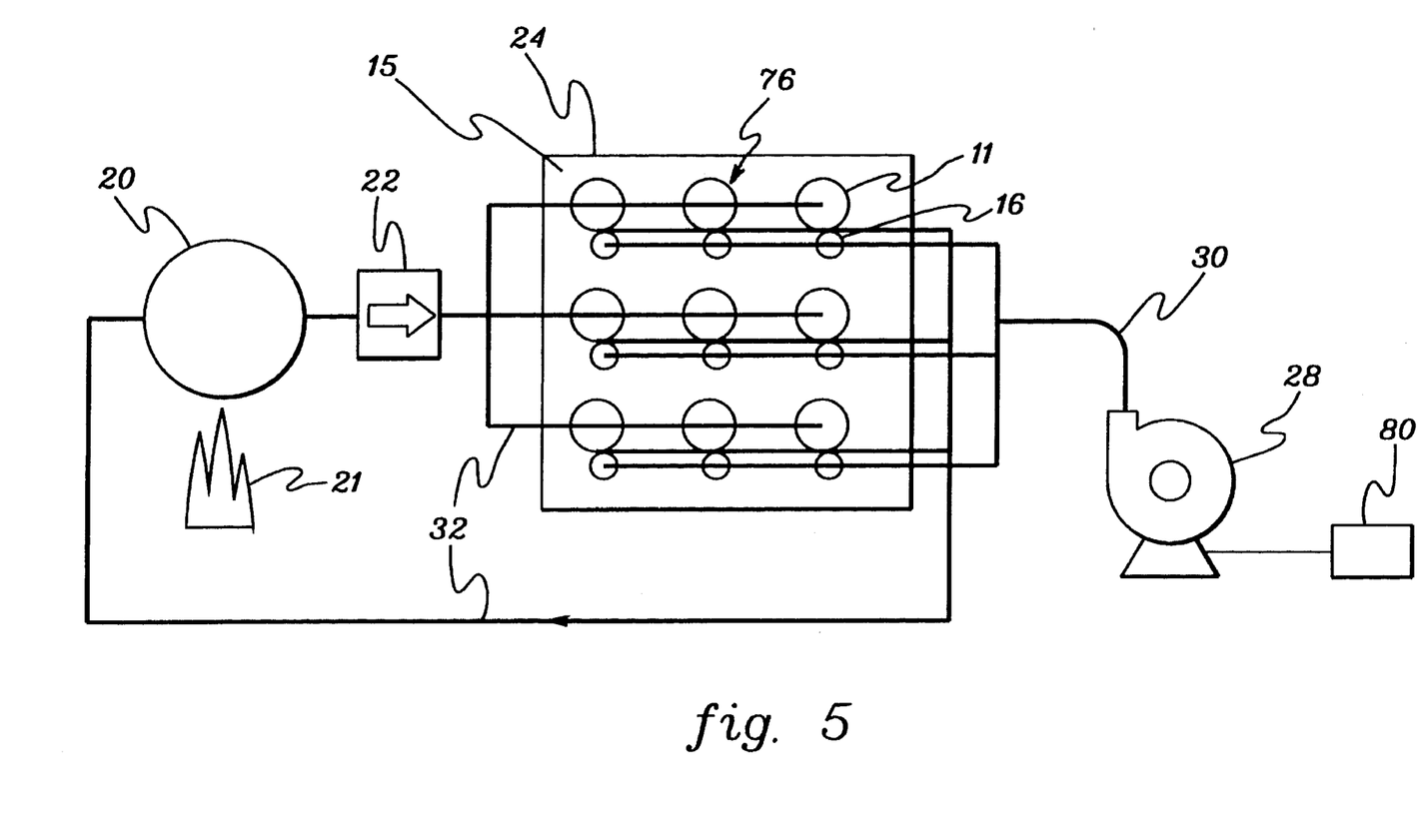
FIG. 5 is a block diagram illustrating a soil warming system in accordance with the present invention for soil remediation.

In a soil remediation system, with reference to FIB. 5, a plurality of "HEATTRODE" soil warming probes 76 are inserted into soil 15 in spaced relationship to one another within a given area 24 to be remediated. Preferably, each soil warming probe comprises the integrated warming probe 10'. Alternatively, each soil warming probe includes associated warming probe 11 and permeable tube 16 disposed or attached adjacent to one another. Hot water inlets 13 and water outlets 17 of respective probes are coupled via appropriate plumbing 32 to and from boiler 20. Boiler 20 heats contained liquid by a fossil fuel source 21, or other appropriate heating means, which heated liquid is then pumped by pump 22 through the associated warming probes 11 or alternatively the transfer tubes 68,66.

Permeable tubes 16 are connected to a fluid pump 28 by fluid plumbing 30 to receive associated supplemental fluid to be dispensed adjacent respective warming probes 11. In the preferred embodiment, the fluid plumbing is coupled to fluid entrances 19 of associated end adapters 60 for supplying the supplemental fluid to fluid channels 70 within the hollow cavity of the integrated warming probes 10'. In one aspect of the present invention, the fluid includes pulsed air. Pulsing is providing by pulse discharging means 80, which could be, for example, a switch and timer to control power to pump 28. In another aspect of the present invention, the supplemental fluid includes steam nutrients, oxygen, non-indigenous microbes, and/or pH controlling fluids for enhancing biological activity within the soil.

In operation, pump 22 circulates heated liquid through soil warming probes 10 for heating the soil of the remediation site 24 with the assistance of the supplemental fluids. The supplemental fluids enhance heat dissipation into the soil such that steep temperature gradients are avoided proximate soil warming probes 76 and a more uniform temperature environment is provided within the area 24 of soil remediation.

Figure 6:
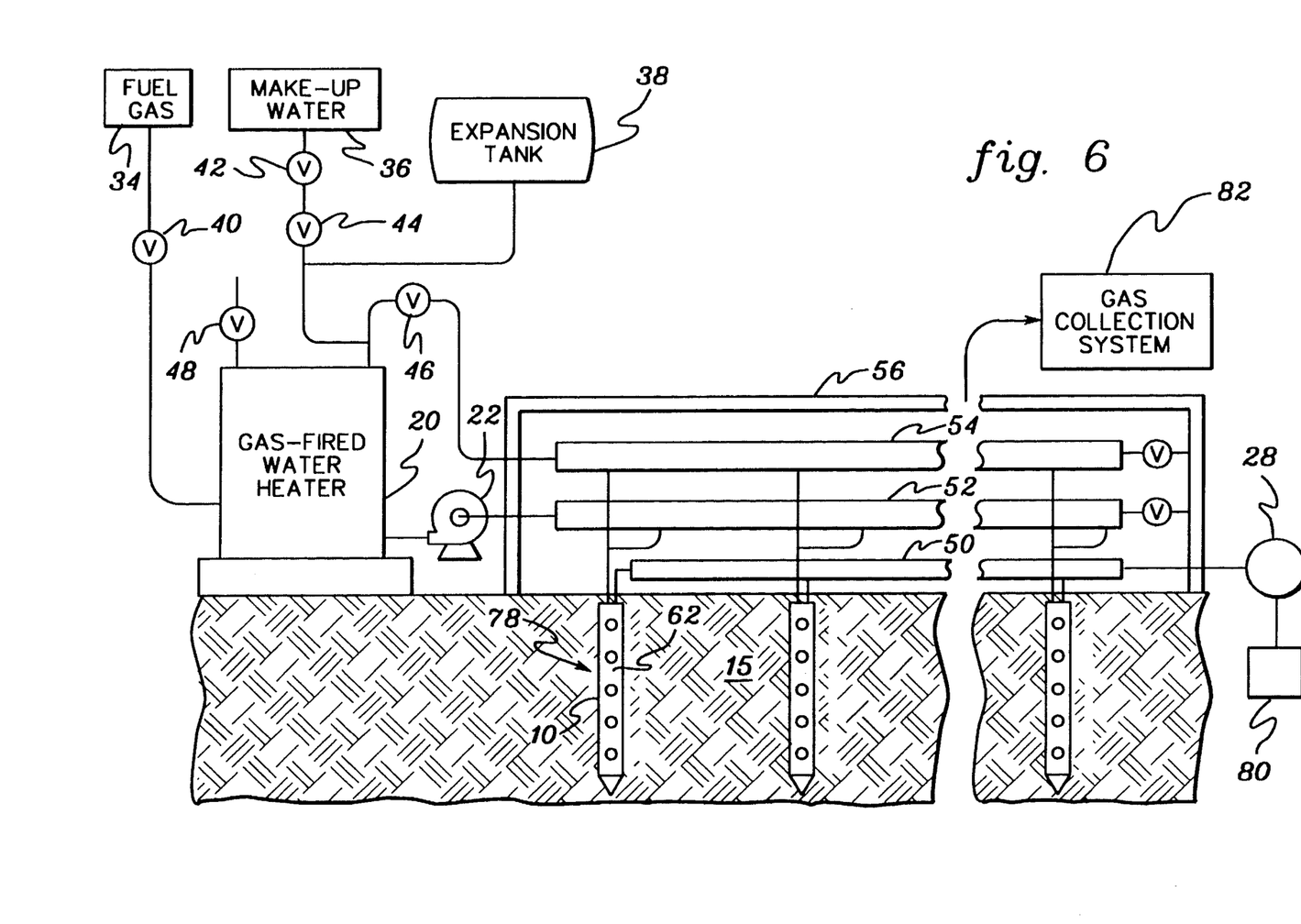
FIG. 6 presents an alternative block diagram illustrating a soil remediation system in accordance with the present invention.

A more detailed soil remediation system in accordance with the present invention is described with reference to FIG. 6. Again, an array of intergrated soil warming probes 78 are disposed in spaced relationship with respect to one another within a given region of soil 15. Water distribution systems are provided between a gas fired water heater 20 and associated soil warming probes 78. Water leaves gas fired heater 20, passes through fluid control valve 46 and flows into a hot water supply distribution manifold 54. Distribution manifold 54 distributes hot water into each of the respective warming probes 10'. The cold water return from each warming probe 10' is coupled to the cold water return manifold 52. Water from the return manifold 52 is pumped by pump 22 back to water heater 20 for rewarming.

The water heater 20 receives fossil fuel from a fuel gas container 34 via an on/off valve 40. Water is supplied from a water source 36 to water heater 20 via on/off valve 42 and pressure release valve 44. The water channel between pressure release valve 44 and water heater 20 is coupled to a water expansion reservoir 38 which accommodates expansion of the water contained within the overall water circulation system. Safety release valve 48 is coupled to the hot water heater for releasing pressure should the pressure exceed a given safety limit.

Each of the intergrated warming probes 78 includes permeable outer tube 62 coupled to the supplemental fluid manifold 50. The fluid manifold receives fluid from fluid pump 28. The fluid is distributed to each of the permeable outer tubes for enhancing the thermal conductivity of the soil proximate thereto. Alternatively, the fluid comprises gases or nutrients for enhancing bioremediation. Preferably, an insulation cover 56, such as a bubble sheet, covers the ground associated with soil remediation. In addition, a gas collection system 82 may be incorporated for collecting vapors released from the soil. The gas collection system 82 may comprise, for example, a pump and treatment system.

In the soil remediation system described hereinbefore, it is understood that warming probes 11 and respective permeable tubes 16 could replace the integrated soil warming probes 10' of the preferred embodiment.

While several aspects of the present invention have been described and depicted herein, alternative aspects may be effected by those skilled in the art to accomplish the same objectives. Accordingly, it is intended by the appended claims to cover all such alternative aspects that fall within the true spirit and scope of the invention.

What is claimed is:

1. An apparatus for assisting soil remediation comprising:
   transfer means for transferring thermal energy to soil; and
   means for introducing a supplemental fluid into soil surrounding said transfer means, wherein said thermal energy and said fluid assist said soil remediation.

2. An apparatus according to claim 1 further comprising heat means for providing heat to said transfer means.

3. An apparatus according to claim 2 wherein said heat means include a boiler for heating a circulating fluid and a pump for circulating said circulating fluid between said boiler and said transfer means.

4. An apparatus according to claim 3 wherein said transfer means includes a coaxial probe having:
   an inner tube with an inner channel communicating via said circulating fluid with said boiler; and
   an outer tube defining a cylindrical channel between an outside radius of said inner tube and an inner radius of said outer tube, the cylindrical channel therebetween being in communication, via said circulating fluid, with said inner channel; and
   wherein said circulating fluid is pumped by said pump in a closed loop from said boiler, through said inner channel, through said cylindrical channel, and back to said boiler.

5. An apparatus according to claim 4 wherein said means for introducing a supplemental fluid comprises a fluid permeable tube disposed alongside said coaxial probe.

6. An apparatus according to claim 5 wherein said fluid permeable tube has walls permeable for passing gases.

7. An apparatus according to claim 5 wherein said fluid permeable tube has walls permeable for passing liquids.

8. An apparatus according to claim 5 wherein said means for introducing a supplemental fluid comprises means for supplying supplemental fluid to said fluid permeable tube.

9. A method of facilitating soil remediation with a probe including heat transfer apparatus and supplemental fluid introduction apparatus, the method comprising steps of:
   probing soil with said probe, wherein said heat transfer apparatus heats the soil surrounding said probe; and
   injecting supplemental fluid into the soil surrounding said probe via said supplemental fluid introduction apparatus for enhancing remediation thereof, wherein said supplemental fluid introduction apparatus operates independent from said heat transfer apparatus.

10. A method according to claim 9 further comprising circulating a heated fluid through the heat transfer apparatus.

11. A method according to claim 9, wherein said supplemental fluid enhances bioremediation.

12. A method according to claim 9 wherein said step of injecting includes injecting a gas into the soil surrounding said probe.

13. A method according to claim 12 wherein said gas is injected via a sequence of pulsed gas injections.

14. A method according to claim 9 wherein said step of injecting includes injecting a liquid into the soil adjacent said heat transfer apparatus.

15. A method according to claim 9 wherein said step of injecting includes injecting nutrients for enhancing bioremediation.

16. A method according to claim 9 further comprising covering the soil under soil remediation, as probed by said probe, within an insulating cover.

17. A method according to claim 9 further comprising a step of collecting vapors released from the soil due to said remediation.

18. A method according to claim 10, wherein said probe comprises a hollow inner cavity, wherein said step of circulating comprises circulating said heated fluid through said hollow inner cavity, and wherein said step of injecting comprises a step of dispensing said supplemental fluid proximate said probe through a permeable tube inserted into the soil.

19. An apparatus for warming soil comprising:
   heating means for warming a circulating fluid;
   pump means for circulating the circulating fluid;
   a coaxial probe having an inner fluid channel in communication with a cylindrical fluid channel coaxially about said inner channel, said coaxial probe being coupled to pass the circulating fluid through said inner fluid channel and said cylindrical fluid channel as the circulating fluid is circulated by said pump means; and
   a permeable tube disposed adjacent said coaxial probe for dispensing supplemental fluid proximate said coaxial probe, wherein when said circulating fluid is circulated, said soil is warmed.

20. An apparatus according to claim 19 further comprising means for supplying said permeable tube with a Supplemental fluid for assisting thermal transfer of heat away from said coaxial probe.

21. An apparatus according to claim 20 wherein said supplemental fluid includes a gas.

22. An apparatus according to claim 20 wherein said supplemental fluid includes steam.

23. An apparatus for warming soil comprising:

heating means for warming a contained fluid;

pump means for circulating the contained fluid;

a coaxial probe having an inner fluid channel in communication with a cylindrical fluid channel coaxially about said inner Channel, said coaxial probe being coupled to pass the contained fluid through said inner fluid channel and said cylindrical fluid channel as the contained fluid is circulated by said pump means;

a permeable tube disposed adjacent said coaxial probe for dispensing fluid proximate said coaxial probe; and means for supplying said permeable tube with a fluid for assisting bioremediation.

24. An apparatus according to claim 23 wherein said supplemental fluid includes a gas.

25. An apparatus according to claim 23 wherein said supplemental fluid includes steam.

26. An apparatus according to claim 19, further comprising:

a plurality of said coaxial probe in spaced relationship to one another for warming a given area of soil; and a plurality of said permeable tube associated with respective coaxial probes for dispensing supplemental fluid proximate thereto.

27. An apparatus for warming soil comprising:

a soil probe having a hollow inner cavity and permeable walls; and thermal transfer means for circulating a circulating fluid within the hollow inner cavity of said soil probe and thermally coupling said circulating fluid to the permeable walls of said soil probe;

wherein said thermal transfer means is disposed within the hollow inner cavity of said probe so as to leave an independent channel within the hollow inner cavity between the thermal transfer means and the permeable walls of said soil probe for channeling a supplemental fluid within and through the permeable walls of said soil probe, and wherein when said apparatus is placed in said soil and said circulating fluid is circulated, said soil is warmed.

28. An apparatus according to claim 27, wherein the permeable walls of said soil probe are permeable for passing a gas.

29. An apparatus according to claim 27, wherein the permeable walls of said soil probe are permeable for passing a liquid.

30. An apparatus according to claim 27 further comprising means for supplying the supplemental fluid to said independent channel within the hollow cavity of said soil probe.

31. An apparatus according to claim 30, wherein said supply means supplies supplemental fluid for enhancing thermal transfer of heat away from said soil probe.

32. An apparatus for warming soil comprising a plurality of integrated said soil warming probe and associated said thermal transfer means as defined in claim 27 in spaced relationships to one another for warming a given area of soil.

33. An apparatus for warming soil comprising:

a soil probe having a hollow inner cavity and permeable walls, wherein said soil probe comprises a permeable tube having first and second ends, and a conical cap at the first end of said permeable tube for facilitating penetration of said soil probe into soil; and thermal transfer means for circulating contained fluid within the hollow inner cavity of the soil probe and thermally coupling said contained fluid to the permeable walls of said soil probe;

wherein said thermal transfer means is disposed within the hollow inner cavity of said probe so as to leave an independent channel within the hollow inner cavity between the thermal transfer means and the permeable walls of said soil probe for channeling a supplemental fluid within and through the permeable walls of said soil probe.

34. An apparatus according to claim 33 wherein said thermal transfer means comprises a conductive tube within said permeable tube and having inlet and outlet ends thereof proximate the second end of said permeable tube, a length of said conductive tube being folded upon itself within said permeable tube with walls of said conductive tube thermally contacting inside walls of said permeable tube, said conductive tube having an inner channel along the length thereof between said inlet and outlet ends for circulating said circulating fluid within.

35. An apparatus according to claim 34 further comprising:

boiler means for heating said circulating fluid; and plumbing means for circulating said circulating fluid through said boiler means and through said conductive tube.

36. An apparatus according to claim 33 wherein said thermal transfer means comprises:

a heat transfer supply tube disposed within said permeable tube and having a first end for receiving said circulating fluid, said heat transfer supply tube extending substantially the length of said permeable tube;

a heat transfer return tube disposed within said permeable tube and having a first end for returning said circulating fluid, said heat transfer return tube extending substantially the length of said permeable tube alongside said heat transfer supply tube; and an inner coupling member disposed within said permeable tube proximate said conical cap, said inner coupling member coupling a second end of said heat transfer supply tube for providing a fluid intercoupling channel therebetween so that said circulating fluid may flow from said heat transfer supply tube, through said fluid intercoupling channel and to said heat transfer return tube without escape into said permeable tube.

37. An apparatus for warming soil comprising:

a soil probe having a hollow inner cavity and permeable walls; and thermal transfer means for circulating contained fluid within the hollow inner cavity of said soil probe and thermally coupling said contained fluid to the permeable walls of said soil probe, wherein said thermal transfer means is disposed within the hollow inner cavity of said probe so as to leave an independent channel within the hollow inner cavity between the thermal transfer means and the permeable walls of said soil probe for channeling a supplemental fluid within and through the permeable walls of said soil probe; and means for supplying the supplemental fluid to said independent channel within the hollow cavity of said soil probe, wherein said supply means supplies supplemental fluid for enhancing bioremediation of soil.

38. An apparatus for warming soil comprising:

a soil probe having a hollow inner cavity and permeable walls; and thermal transfer means for circulating contained fluid within the hollow inner cavity of said soil probe and thermally Coupling said contained fluid to the permeable walls of said soil probe, wherein said thermal transfer means is disposed within the hollow inner cavity of said probe so as to leave an independent channel within the hollow inner cavity between the thermal transfer means and the permeable walls of said soil probe for channeling a supplemental fluid within and through the permeable walls of said soil probe; and means for supplying the supplemental fluid to said independent channel within the hollow cavity of said soil probe, wherein said supply means includes means for pulse discharging the supplemental fluid to said independent channel.

\* \* \* \* \*

UNITED STATES PATENT AND TRADEMARK OFFICE
CERTIFICATE OF CORRECTION

PATENT NO.      : 5,558,463
DATED           : September 24, 1996
INVENTOR(S)     : Geisel, Donald J.

It is certified that error appears in the above-identified patent and that said Letters Patent is hereby corrected as shown below:

In column 8, line 46, insert --to a second end of said heat transfer return tube-- between "tube" and "for".

Signed and Sealed this

Thirty-first Day of December, 1996

Attest:

BRUCE LEHMAN

*Attesting Officer*         Commissioner of Patents and Trademarks